April 2, 1957 H. BURKHARDT 2,787,592
METHOD FOR THE TREATMENT OF METAL
Filed Nov. 22, 1949
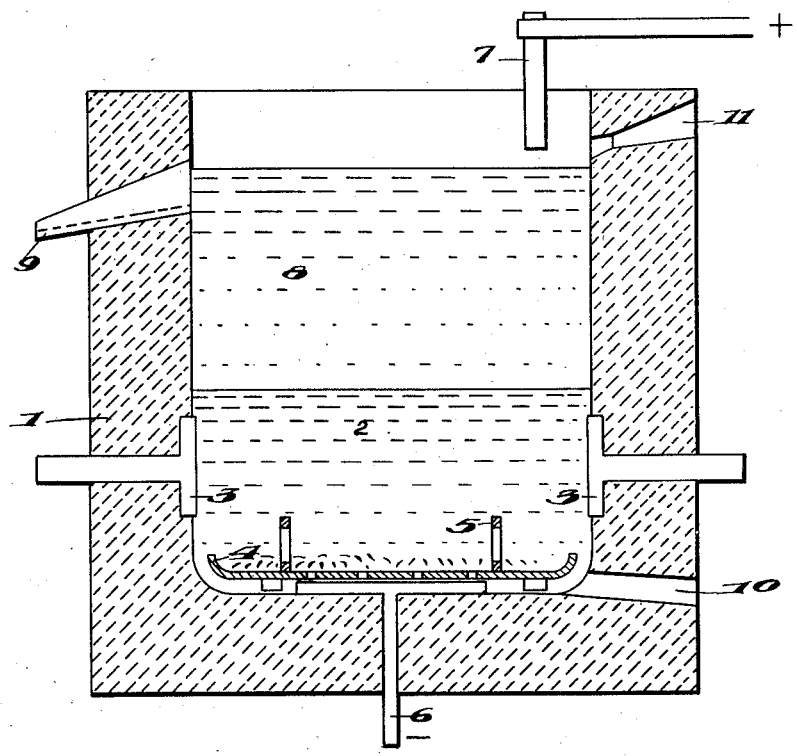
INVENTOR
HANS BURKHARDT,
BY *[signature]*
ATTORNEYS

United States Patent Office 2,787,592
Patented Apr. 2, 1957

2,787,592
METHOD FOR THE TREATMENT OF METAL

Hans Burkhardt, Oberursel (Taunus), near Frankfurt am Main, Germany, assignor to Vereinigte Deutsche Metallwerke Aktiengesellschaft, Frankfurt am Main, a corporation of Germany Application November 22, 1949, Serial No. 128,744

In Germany October 1, 1948

Public Law 619, August 23, 1954
Patent expires October 1, 1968

7 Claims. (Cl. 204—140)

This invention relates to a method and a furnace for the treatment, i. e. the melting and refining, of light metal, more particularly of aluminum scrap and aluminum alloy scrap.

Scrap metals of the kind referred to mostly contain particles of heavier metals, especially iron and copper, in the form of screws, wires, rivets, chips and the like, which when getting into the light metal melt and remaining therein, will be dissolved by the same and reduce the quality of the light metal or render it useless. On the other hand, it would require too much expenditure to remove these small parts of heavy metals mechanically before the melting.

According to the conventional method, the light metal was melted off from the scrap metal supplied into an inclined furnace, for collection in the lower parts of the furnace. By means of a dam provided at the melting-off point the heavy metal parts were prevented from also moving towards the lower part of the furnace. It will be understood that in such a melting-off process the loss or waste of light metal due to oxidation is very high, the more so as these scrap metals mostly consist of parts having a large surface, and the melting requires a relatively high amount of energy.

As is well known, the light metal melts originating from such scrap metal charges, in order to remove detrimental impurities, such as oxides, nitrides and gases, such as hydrogen or alloying components to be reduced or to be removed, such as, e. g. magnesium, mostly have to be subjected to a refining treatment which so far in general consisted in stirring the melt with salts or introducing chlorine into the melt. Both treatments, i. e., the melting and the refining process, are bound to increase the loss due to oxidation, and the feeding of chlorine is moreover disagreeable and requires the use of a larger number of feeding tubes which have to be exchanged rather oftentimes. A further disadvantage of the existing process consists in that the heavy metal dissolved in the melt, especially iron, while it can partly be separated by allowing the aluminides to settle, is difficult to remove from the melt in the form of said deposits, so that the danger is present that the heavy metal is cast with the melt.

It is the object of the present invention to provide means by which said drawbacks of the existing processes can be avoided.

With this object in view according to the present invention a bath of molten salt is used which has a higher specific gravity than the light metal, but a lower specific gravity than the parts of heavy metals admixed to the light metal, so that the same sink into the salt melt immediately after the melting of the light metal and are thereby prevented from forming an alloy with the light metal.

For the salt bath the halides, more particularly the chlorides, of the alkaline earth metals, such as barium chloride, strontium chloride or calcium chloride mixed with barium chloride in a ratio of 4:1 to 1:4 proved particularly suitable. A preferred composition comprises 78 percent of barium chloride with 22 percent of calcium chloride, of a specific gravity of about 3.45 and a melting temperature of about 600° C. or a composition corresponding to one of the aforementioned proportions, in which the barium salt, the calcium salt or strontium salt is partly or entirely replaced by the corresponding fluoride salts. Thus, for instance, instead of 78 percent of barium chloride 68 percent of barium chloride and 10 percent of barium fluoride may be used.

By application of salt mixtures it is possible to control the specific gravity and the melting temperature of the salt melt as required. It is also possible, therefore, by means of the method according to the present invention, to separate from the metal salt undesirable alloying components of the light metal, such as, heavy metal aluminides, more particularly iron aluminides, and others which have a higher specific gravity than aluminum and thereby fall through the salt melt disposed thereunder. In order to carry out such a process the melting temperature is kept as closely as possible above the solidifying temperature, taking care that the salt melt at this temperature is still in a very liquid state. The easy fusibility can be improved by admixing further low-melting salts, such as, e. g., sodium chloride, potassium chloride or other alkaline halides or magnesium halide, taking care that the specific gravity of the salt melt does not exceed that of the metal melt. The method, therefore, is also very suitable for the melting of light metal containing heavy metals in an alloyed form, such as, in the form of heavy metal alumnides rather than in a mechanically admixed form.

In the method according to the invention the melting of the light metal may be effected by direct heating in the conventional manner.

It has been found that it is particularly favorable, however, especially as regards a reduction of the loss by oxidation, to effect the heating by means of the salt bath. In this case only the salt bath is heated which transmits its heat to the light metal charge from below. The salt bath is advantageously heated by alternating current, by means of electrodes.

This method of melting light metals by means of a heated salt melt of a higher specific gravity proved to be very advantageous and affords savings of expenses and time in operation, so that it can be used with good success also where a removal of heavy metals from the light metal melts is not intended.

According to the invention the refining of the molten light metal is effected by halides as components of the salt melt, by passing direct current through the salt and metal melts. The light metal melt in this case forms the anode. Hence, at its boundary surface with the salt melt halogens, such as, e. g., in case of a contents of chlorides in the salt melt, chlorine, will be developed according to the formula

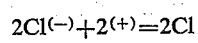

$$2Cl^{(-)} + 2^{(+)} = 2Cl$$

which during its reaction with the light metal owing to its uniform fine dispersal will effectuate a particularly thorough refining, avoiding all the disagreeable auxiliary phenomenona which had been involved in the conventional feeding of chlorine from outside.

A furnace for use in connection with the process according to the invention has been shown in the accompanying drawing, in a sectional view.

Referring to the drawing, it will be seen that the outer brick lining 1 contains a salt melt 2 which has a higher specific gravity than an aluminum melt 3 superposed thereto, and a lower specific gravity than the heavy metals which are to be removed from the light metal melt. The furnace is heated by alternating current of a low voltage which is passed through the salt melt by means of iron electrodes 3. When the light metal, which is charged from above, is melting, after the salt already has been molten, the admixed heavy metal parts will sink into the salt bath on to a screening plate or trough 4 by which they can be drawn out of the furnace from time to time, by means of rings 5 fastened to the screening trough. In order to refine the light metal melt, direct current is passed through it by means of an electrode 6 and a carbon rod 7, the light metal melt 8 serving as a positive electrode. The molten light metal is removed by a tap hole 9. An opening 10 serves to discharge the salt melt from the furnace before cleaning the same.

Through an opening 11 in the brick lining the filled-in salt is caused to melt by means of a burner (not shown) as the furnace is put into operation, since the low electric conductivity of the salts in a non-molten condition renders it difficult to melt them by the passage of electric current. If desired, an auxiliary electrode may be used instead of the burner, in a manner known per se.

As an example for carrying out a melting and refining process a furnace may be assumed whose inner diameter is 500 mm. The height of the salt melt is 300 mm., corresponding to a weight of the salt mixture of 200 kg., that of the metal melt is about 550 mm. corresponding to a weight of 300 kg. The phase voltage of the alternating heating current applied may be 40 volts. In this case, about 120 kilowatt hours are required for the melting. By feeding an amount of direct current of 3,300 ampere hours at a voltage of 36 volts the melt is freed from gases and oxides and the magnesium content is reduced by about 0.5 percent to about 0.2 percent.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A method of melting aluminum base metal scrap containing foreign heavy metal parts to separate such heavy metal parts from such aluminum base metal which comprises melting the aluminum base metal while the scrap is supported by a substantially quiescent fused salt melt which has a higher specific gravity than said aluminum base metal and a lower specific gravity than the foreign heavy metal parts contained in such scrap and permitting the heavy metal parts freed by the melting of the aluminum base metal to descend through the fused salt melt upon which the scrap being melted is supported.

2. A method in accordance with claim 1, in which said salt melt comprises a mixture of halides including at least one alkaline earth metal halide.

3. A method in accordance with claim 1, in which said salt melt comprises a mixture of halides including at least one calcium halide and at least one barium halide.

4. A method in accordance with claim 1 in which the salt melt essentially consists of a mixture of at least one calcium halide and at least one barium halide, said halides being selected from the group consisting of calcium chloride, calcium fluoride, barium chloride and barium fluoride.

5. A method of melting aluminum base metal scrap containing foreign heavy metal parts to separate such heavy metal parts from such aluminum base metal and refining the melted aluminum base metal which comprises disposing the aluminum base metal scrap on a substantially quiescent fused salt melt which has a higher specific gravity than said aluminum base metal and a lower specific gravity than the heavy foreign metal parts, supplying heat of fusion to the aluminum base metal only through the salt melt to melt such aluminum base metal, and permitting the heavy metal parts freed by the melting of the aluminum base metal to descend through the fused salt melt upon which the scrap being melted is supported.

6. A method of melting aluminum base metal scrap containing foreign heavy metal parts to separate such heavy metal parts from such aluminum base metal which comprises melting the aluminum base metal while the scrap is supported by a substantially quiescent fused salt melt containing halides which has a higher specific gravity than said aluminum base metal and a lower specific gravity than the foreign heavy metal parts contained in such scrap, permitting the heavy metal parts freed by the melting of the aluminum base metal to descend through the fused salt melt upon which the scrap being melted is supported and thereafter refining the resulting aluminum base metal melt while it is supported on said fused salt melt by passing a direct current through the salt melt with aluminum base metal melt as the anode.

7. A method in accordance with claim 6 in which said aluminum base metal is an aluminum base alloy containing magnesium.

References Cited in the file of this patent

UNITED STATES PATENTS

| Number | Name | Date |
|---|---|---|
| 800,984 | Chance | Oct. 3, 1905 |
| 850,726 | Bills | Apr. 16, 1907 |
| 1,513,875 | Wilke | Nov. 4, 1924 |
| 1,534,318 | Hoopes et al. | Apr. 21, 1925 |
| 1,564,139 | Saklatwalla | Dec. 1, 1925 |
| 1,576,080 | Beck | Mar. 9, 1926 |
| 1,940,618 | Barstow et al. | Dec. 19, 1933 |
| 1,940,619 | Barstow et al. | Dec. 19, 1933 |
| 2,130,801 | Hulse | Sept. 20, 1938 |
| 2,264,740 | Brown | Dec. 2, 1941 |
| 2,355,130 | Yerkes | Aug. 8, 1944 |
| 2,426,389 | Chew | Aug. 26, 1947 |
| 2,620,269 | Haney et al. | Dec. 2, 1952 |

FOREIGN PATENTS

| Number | Country | Date |
|---|---|---|
| 404,563 | Great Britain | Jan. 18, 1934 |
| 489,700 | Great Britain | Aug. 2, 1938 |
| 557,262 | Great Britain | Nov. 12, 1943 |